Dec. 10, 1940.    A. D. SUND    2,224,616

ANIMAL TRAP

Filed Nov. 13, 1939

INVENTOR
Alfred D. Sund
BY
Harry Schroeder
ATTORNEY

Patented Dec. 10, 1940

2,224,616

UNITED STATES PATENT OFFICE 2,224,616

ANIMAL TRAP

Alfred D. Sund, Santa Rosa, Calif.

Application November 13, 1939, Serial No. 303,976

5 Claims. (Cl. 43—81)

This invention relates to traps and particularly to the common snap type used for catching rats and mice.

It is an object of the invention to provide a greatly sensitized trigger action for springing the trap.

Another object of the invention is to provide an improved one-piece bait holder and trigger for the trap.

A further object of the invention is to provide means associated with the trigger which produces identical successive settings of the trigger so that, without the user paying especial attention to the setting of the trigger, the latter will always be set in its most sensitive position.

The invention possesses other objects and features of advantage, some of which, together with the foregoing, will be specifically set forth in the detailed description of my invention hereunto annexed. It is to be understood that the invention is not to be limited to the specific form thereof herein shown and described as various other embodiments thereof may be employed within the scope of the appended claims.

Referring to the drawing.

Figure 1:
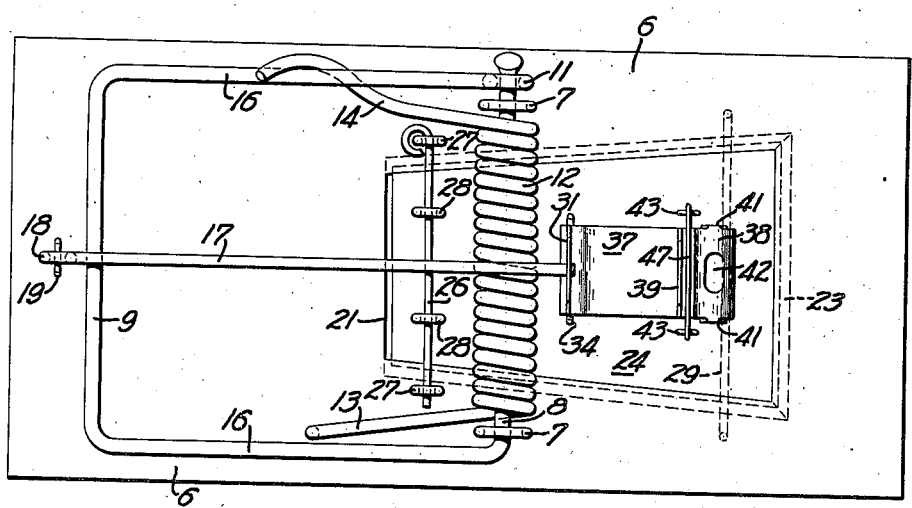
Figure 1 is a top plan view of the complete trap of my invention.
Figure 2:
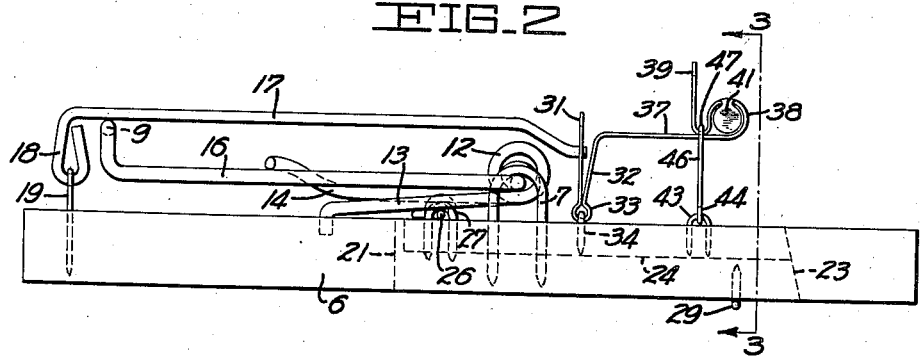
Figure 2 is a side elevational view of the structure shown in Figure 1.
Figure 3:
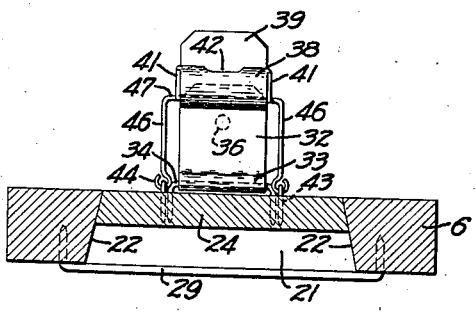
Figure 3 is a transverse vertical sectional view of the trap. The plane in which the view is taken is indicated by the line 3—3 of Figure 2, and most of the background structure is omitted so as to render the view less complicated.
Figure 4:
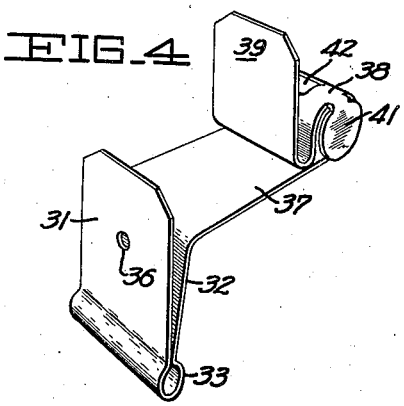
Figure 4 is a perspective view of the one-piece trigger and bait holder.

In detail, my trap comprises the usual preferably wooden base 6 having intermediate its ends, and positioned adjacent its opposite longitudinal edges, a pair of staples 7 which form journals for the axle portion 8 of the trap jaw 9 which is composed of an extension of the axle 8 formed into a rectangular loop and provided at its end with an eye 11 which encircles the axle. The usual coiled torsion spring 12, concentric with and surrounding the axle 8 has one radially extending end 13 thereof engaged in the base 6 and the other radially extending end 14 thereof in engagement with one of the side members 16 of the trap jaw. When the trap jaw is in the position shown in Figures 1 and 2, the spring 12 is tensioned so that, upon release of the trap jaw, the latter will snap about its pivotal axis toward the right hand end of the base so as to clamp the mouse or rat between it and the base. A retainer rod 17, having at one end an eye 18 which engages a staple 19 secured in the base 6, overlies the trap jaw for holding the latter in its set position and the free end of the retainer rod passes over and slightly beyond the spring 12.

Formed in the base 6, and positioned slightly beyond the center and toward the right-hand end thereof, is a keystone-shaped opening 21 having downwardly diverging longitudinal sides 22 and the wider end 23 thereof. Loosely positioned in the opening 21 is a complementarily shaped platform 24 which is pivotally connected to the base at the narrower end of the opening. This pivotal connection is effected by a rod 26, overlying the narrow end of the platform, secured at its opposite ends to the base 6 by staples 27, and encircled by staples 28 secured in the platform. A stop rod 29 secured to the lower surface of the base, and extending transversely across the opening 21 near its wider end, is for the purpose of engaging the platform when the latter moves downwardly so as to prevent its passage out of the opening beyond the lower surface of the base. The inclined sides and end of the opening prevent movement of the platform upwardly beyond the upper surface of the base.

Pivotally mounted on the platform 24 is the combined trigger and bait holder comprising a unit piece of sheet metal doubled upon itself adjacent one end to form slightly divergent arms 31 and 32, the bight 33 being shaped to cylindrical form to receive a pivot rod 34 by means of which the trigger is pivotally mounted on the platform. An aperture 36 formed in the arm 31 is provided for releasably engaging the end of the retainer rod 17. An integral horizontal extension 37 of the arm 32 is provided adjacent its end with a portion rolled to form a cylindrical bait chamber 38 and the extreme end portion of the extension 37 is bent upwardly in spaced relation to a side of the bait chamber to form a baffle plate 39. Tabs 41, preferably formed integrally with and extending from the edges of the sheet material which forms the bait chamber, are bent downwardly to positions overlying and closing the opposite ends of the chamber. An upwardly facing aperture 42, formed in the wall of the bait chamber, provides for the admission of bait, such as cheese or meat, into the bait chamber and also provides the only means by which access to the bait may be gained.

Means is provided for insuring identical repeated settings of the release trigger. In the common rodent trap, similar in type to that shown by applicant's drawing, the distance which the free end of the release rod 17 projects into the aperture 36 is never the same for any two settings. Thus the setting may be too sensitive, causing the trap to be prematurely sprung by vibrations of the support upon which the trap may be resting, or not sensitive enough, when the projection of the rod into the aperture is greatest, often permitting the rodent to safely eat or remove the bait from the trigger without springing the trap. I overcome these difficulties by providing means for insuring uniform setting of the trigger so as to produce the most desirable degree of sensitivity of the latter. Secured in transversely spaced relation on the platform 24 is a pair of staples 43 in which the looped ends 44 of a wire bail 46 are movably engaged. The transverse bar 47 of the bail is normally positioned in the space or depression between the side of the bait chamber 38 and the confronting face of the baffle plate 39. In setting the trap the free end of the trap jaw retainer rod 17 is guided into the aperture 36 as the trigger is urged upwardly until stopped by engagement with the bar 47 of the bail. This produces a factory-set degree of engagement between the retainer rod and the arm 31 and it will be clearly seen that such a degree of engagement will be obtained each time that the trap is set.

A rodent in approaching the set trap is prevented, by the baffle plate 39, from reaching the bait contained in the bait chamber 38 in any direction other than from the end and both sides of the trap. This forces the animal to assume a position adjacent the widest portion of the platform 24 so that it must place its forefeet on the platform. This imposes a large portion of the weight of the animal on the pivoted platform which if it alone does not cause springing of the trap will augment the shock on the trigger caused by the animal nibbling at the bait which will surely spring the trap.

Having thus described my invention, what I claim as new and desire to secure by Letters Patent is:

1. A trap comprising a base, a spring-pressed trap jaw pivotally mounted on said base and movable between set and released positions, a retainer rod on said base for holding said trap jaw in said set position, a platform pivotally mounted on said base, a trigger pivotally mounted on said platform and releasably engaged with said retainer rod, and a member carried by said platform and engaging said trigger for restraining pivotal movement of said trigger in one direction.

2. A trap comprising a base having an opening therein, a spring-pressed trap jaw pivotally mounted on said base and movable between set and released positions, a retainer rod pivotally mounted on said base and overlying said trap jaw for releasably holding said trap jaw in said set position, a platform within said base opening and pivotally movable with respect to said base, means associated with said platform and base for confining pivotal movement of said platform to limits within said base opening, a trigger pivotally mounted on said platform and releasably engaging said trap jaw retainer rod, and means separate from and engaging said trigger for limiting the pivotal movement thereof in one direction.

3. A trap comprising a base having an opening therein, a spring-pressed trap jaw pivotally mounted on said base and movable between set and released positions, a retainer rod pivotally mounted on said base and overlying said trap jaw for releasably holding said trap jaw in said set position, a platform within said base opening and pivotally movable with respect to said base, means associated with said platform and base for confining pivotal movement of said platform to limits within said base opening, a unitary piece of material pivotally mounted on said platform, said piece of material being formed to provide a trigger arm, having an aperture therein in which an end of said retainer rod may be releasably engaged, and a bait arm, a portion of said bait arm being retrorsely rolled to provide an enclosed bait chamber and provided with an opening through which bait may be inserted into and removed from said bait chamber, and means separate from said piece of material carried by said platform and engaging one of said arms for restraining pivotal movement of said piece of material in one direction.

4. A trap comprising a base having an opening therein, a spring-pressed trap jaw pivotally mounted on said base and movable between set and released position, a retainer rod pivotally mounted on said base and overlying said trap jaw for releasably holding said trap jaw in said set position, a platform within said base opening and pivotally movable with respect to said base, means associated with said platform and base for confining pivotal movement of said platform to limits within said base opening, a unitary piece of material pivotally mounted on said platform, said piece of material being formed to provide a trigger arm, having an aperture therein in which an end of said retainer rod may be releasably engaged, and a bait arm, a portion of said bait arm being retrorsely rolled to provide an enclosed bait chamber, provided with an opening through which bait may be inserted into and removed from said bait chamber and having an extension forming a baffle plate rising from said bait arm adjacent a side of and in spaced relation to said bait chamber, and a separate member pivotally mounted on said platform and engaging said bait arm in the space between said baffle plate and said bait chamber for limiting pivotal movement of said bait and trigger arms in one direction.

5. A trap comprising a base having an opening therein, a spring-pressed trap jaw pivotally mounted on said base and movable between set and released positions, a retainer rod pivotally mounted on said base and overlying said trap jaw for releasably holding said trap jaw in said set position, a platform within said base opening and pivotally movable with respect to said base, means associated with said platform and base for confining pivotal movement of said platform to limits within said base opening, a pivot staple secured in said platform, a unitary piece of sheet material bent intermediate its ends to form a tubular bight engaged with and journaled on said pivot staple, the ends of said piece of material extending from said bight providing, respectively, a trigger arm, having an aperture therein in which an end of said retainer rod may be releasably engaged, and a bait arm having a portion thereof adjacent its distal end retrorsely rolled to form a tubular bait chamber having open ends and provided with a side opening through which entrance may be had to said bait chamber, tabs formed integrally with and extending from opposite sides of said piece of sheet material and overlying and closing the opposite ends of said bait chamber, the extreme distal end of said bait arm being disposed angularly with respect to the proximal portion of the latter and positioned in spaced relation to a side of said bait chamber to form a baffle plate and a wire bail pivotally mounted on said platform and engaging said bait arm in the space between said baffle plate and the side of said bait chamber.

ALFRED D. SUND.